United States Patent [19]
Rosenberg

[11] 3,854,273
[45] Dec. 17, 1974

[54] APPARATUS FOR PICKING FRUIT GROWING ON A TREE

[76] Inventor: Baruch Rosenberg, 4, Hadekaum St., Ramataim, Israel

[22] Filed: Oct. 30, 1973

[21] Appl. No.: 411,026

[30] Foreign Application Priority Data
Nov. 6, 1972 Israel .................................. 40744

[52] U.S. Cl. .................... 56/334, 56/336, 193/7
[51] Int. Cl. ............................................ A01g 19/08
[58] Field of Search ............................ 56/332–340; 193/7

[56] References Cited
UNITED STATES PATENTS

| 777,572 | 12/1904 | Utterback | 56/332 |
| 888,459 | 5/1908 | Bolinski | 56/334 |
| 1,133,381 | 3/1915 | Kellogg | 56/334 |
| 1,246,173 | 11/1917 | Smith | 56/334 |
| 1,895,155 | 1/1933 | Fisher | 56/333 |
| 2,650,464 | 9/1953 | Bernheim | 56/328 R |
| 3,356,196 | 12/1967 | Sims, Sr. | 193/7 |

FOREIGN PATENTS OR APPLICATIONS

| 889,114 | 12/1943 | France | 56/334 |
| 901,812 | 7/1962 | Great Britain | 56/340 |

Primary Examiner—Russell R. Kinsey
Attorney, Agent, or Firm—Browdy and Neimark

[57] ABSTRACT

A cutterhead for picking fruit growing on a tree that includes an open frame to which an elongated rod is attachable and on which a plurality of leaf-plates are pivotally mounted for movement against the action of a spring from a closed position covering the frame to an open position uncovering the frame. The leaf plates, which are shaped to define a central opening in their closed position, are pivotable against the action of the spring to uncover the frame. A stem cutter is mounted on one of the leaf-plates and has a cutter-bar movable across the central opening. Finally, a selectively actuatable stem cutter operator is provided for moving the cutter bar, and a chute with means for braking the fall of fruit picked from the tree is associated with the frame.

13 Claims, 8 Drawing Figures

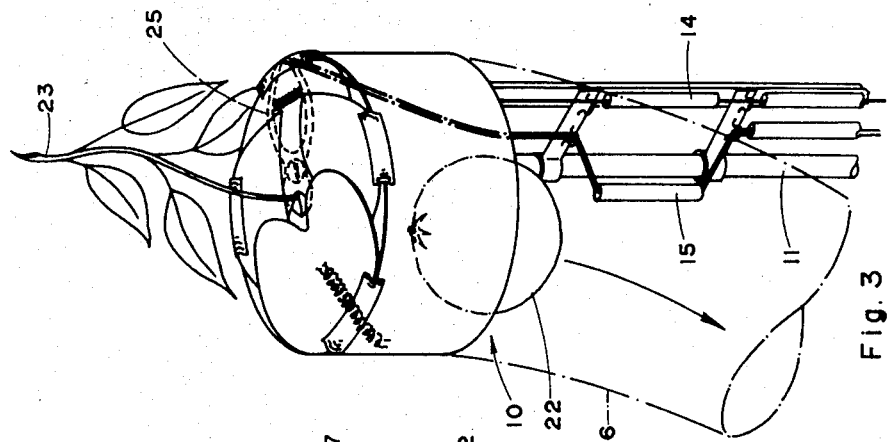
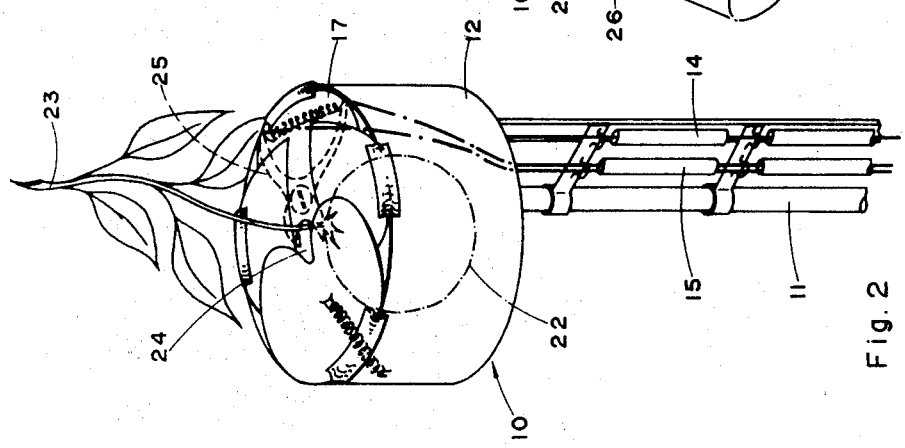
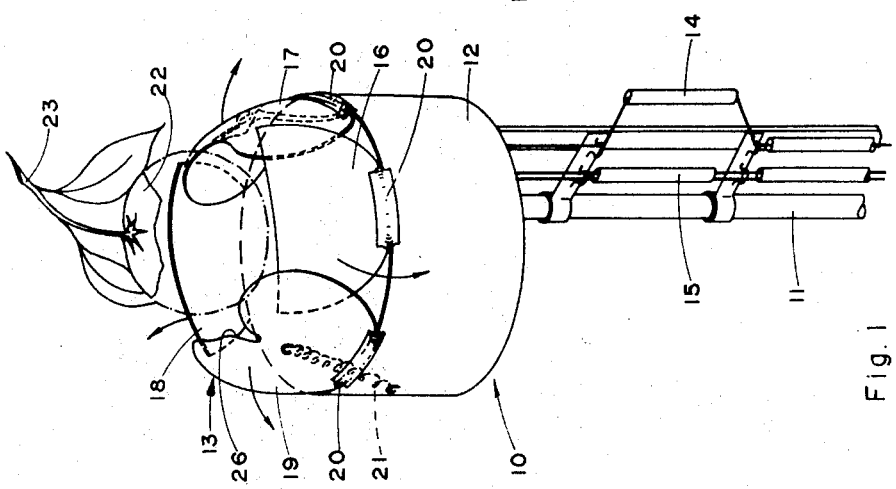

APPARATUS FOR PICKING FRUIT GROWING ON A TREE

This invention relates to apparatus for picking fruit growing on trees.

Practically every kind of tree grown fruit should be hand-picked such that the stem remains attached to the body of the fruit. When fruit is picked in a green or unripe condition, and particularly citrus fruit, proper ripening will occur only if the stem remains attached to the body of the fruit. Detaching the stem apparently accelerates the ripening process raising the likelihood that spoilage will occur before the fruit reaches the consumer. When fruit is picked in a ripe state ready for immediate consumption, the stem should also remain attached in order to deny access to the pulp of the fruit by oxygen, bacteria and insects.

In view of the absolute necessity to retain the stem on the body of the fruit, the picking process is conventionally carried out either by cutting the stem as close as possible to the body of the fruit, or by manually shearing the stem by twisting it in opposite directions between the fingers on the left and right hand of the picker, depending on the type of fruit being harvested. By reason of the techniques required, it is usual to pick only that fruit which can be reached from the ground or from special ladders placed around the trees. Fruit growing near the top of the tree and not easily accessible is generally not picked. Mechanical apparatus such as hydraulically operated lifts are sometimes used to facilitate harvesting, but the clearance required to accommodate such mechanical apparatus is usually not available within many older groves, and in any event the apparatus is costly and is not economically justified for small groves. As a consequence, picking fruit is a tedious, time consuming manual operation that is not only expensive, but may result in a reduction in the value of the crop by reason of accidental or careless detaching of the stems during picking. Furthermore, with some kinds of fruit, particularly avocados, the loss may be aggravated even when the fruit is plucked with the stems intact because the protruding stems bruise the skins of adjacent fruit in the same container, resulting in blemishes on the ripened fruit that reduce the sales appeal and, hence the value of the fruit.

It is therefore an object of the present invention to provide a new and improved apparatus for picking fruit growing on trees, and particularly oranges, wherein severing the stem close to the body of the fruit is facilitated, thus accelerating the picking process and reducing spoilage.

According to the present invention, there is provided an apparatus for picking fruit growing on trees comprising an elongated rod carrying at one end an open frame on which is attached a plurality of hinged leaf-plates defining at least one cover; a leaf-plate operator on the rod for selectively pivoting the leaf-plates of the cover against the action of a spring from a closed position closing the top of the frame to an open position uncovering the top of the frame for effecting entry thereinto of a piece of fruit attached by its stem to a tree; the leaf-plates being shaped so that in their closed position, a central opening is defined through which the stem passes for holding the stem in the path of movement of a stem cutter mounted on the leaf-plates, and a stem cutter operator on the rod for selectively operating the cutter.

By reason of this construction, harvesting of the fruit from a tree is achieved by first actuating the leaf-plate operator for opening the leaf-plates and permitting a piece of fruit growing on a tree to enter into the frame when the apparatus is raised to a sufficient vertical height relative to the tree, followed by deactuating the leaf-plate operator whereby the stem is captured in the central opening in the leaf plate. At this stage, the fruit is suspended within the frame with the stem passing through the central opening in the cover. Now, the stem cutter operator may be actuated, causing the stem to be severed by the cutter mounted on the leaf-plates, thus assuring that the picking of the fruit is achieved with a portion of the stem attached to the body of the fruit. Preferably, the leaf plate and the cutter can be operated respectively from any one of a plurality of operators located at various levels on the rod of the apparatus. In this fashion, a person holding the rod can comfortably reach the operators regardless of the height to which he must raise the rod to reach the fruit. In this way, fruit on a tree at a level significantly higher than the elevation of a person picking the fruit can be harvested easily.

An embodiment of the invention is illustrated by way of example in the accompanying drawings, wherein:

FIG. 1 is a perspective view of the apparatus according to the present invention, showing the leaf-plates in an open position for receiving a piece of fruit growing on a tree;

FIG. 2 is a perspective view of the apparatus shown in FIG. 1 but with the leaf-plates closed, showing the capture of the stem of the fruit; and FIG. 3 is a perspective view similar to FIG. 2 but showing the stem cutter effective to sever the stem and the fruit dropping through the open bottom of the frame of the apparatus.

Figures 4, 5:
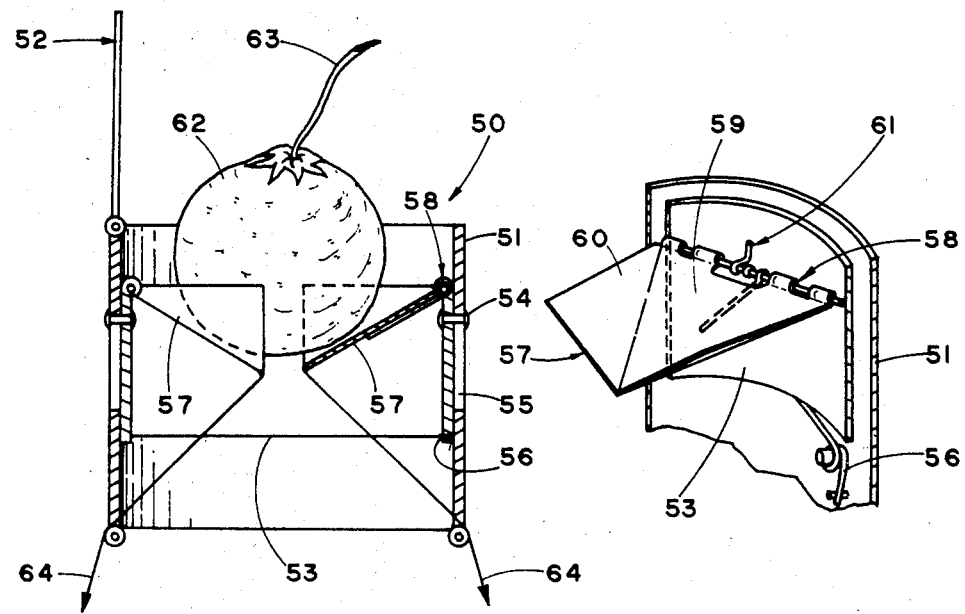
FIG. 4 is a sectional view through a second embodiment of the invention.
FIG. 5 is a perspective view of one of the flaps shown in FIG. 4.

Referring now to FIG. 1 of the drawing, reference numeral 10 designates apparatus according to the present invention for picking fruit growing on a tree comprising an elongated rod 11, frame 12, a plurality of hinged leaf-plates defining a cover 13, leaf-plate operator 14, and a stem cutter operator 15. Rod 11 may be a tubular aluminium rod for providing both strength and rigidity, and of a length sufficient to provide the desired added reach for a person picking fruit from the trees. Frame 12 carried at one end of the rod is essentially an open-ended, tubular metallic or plastic cylinder of a diameter large enough to receive the largest size of fruit likely to be found on a tree. Preferably, the rod is attached to the frame along one side thereof to permit the fruit after being severed from the tree, to drop through the open bottom end of the frame.

The cover 13 comprises a plurality of hinged leaf-plates 16 – 19, each having an edge adjacent the top open end of frame 12 and hinged thereto by a flexible hinge 20. The four leaf plates are quadrantly located around the top of frame 12 and are interleaved as shown best in FIG. 1 so that the opening of one of the plates, namely plate 17, imparts opening movement to the other three plates. The interleaving is accomplished by having the pair of plates 16 and 18 circumferentially spaced 90° on either side of plate 17 to overlap the latter plate, and by having the plate opposite plate 17, namely plate 19, overlap both of plates 16 and 18. By reason of this arrangement, spring 21 attached at one end to the frame 12 and attached at the other end to leaf 19 will resiliently urge all four of the leaf-plates to their closed position. To protect against bruising the fruit the frame and leaf plates may be covered with polyurethane foam.

When leaf-plate operator 14 is actuated, as shown in FIG. 1, leafplate 17 is caused to pivot upwardly from its closed position to its open position, thus imparting opening movement to plates 16 and 18, these plates in turn imparting opening movement to plate 19. In the open position of the plates, as shown in FIG. 1, the free ends of each of the plates are spaced from each other sufficiently far to receive a piece of fruit 22 into the frame 12. Because fruit 22 is suspended by its stem 23 from the tree, and is essentially fixed in a vertical direction, a person picking the fruit and grasping the rod 11 need only actuate the leaf-plate operator 14 and move the apparatus 10 vertically until the fruit enters within frame 12. For convenience, a plurality of spaced leaf-plate operators and cutter operators can be located on rod 11, each of the operators being capable of independently actuating its appropriate mechanism thus significantly facilitating picking fruit.

As seen in FIGS. 1 and 2, the leaf-plates are shaped on their free end opposite their hinged end so that in a closed position, a central opening 24 is defined through which the stem passes when the leaf-plate operator 14 is actuated as shown in FIG. 2. When deactuation occurs, the stem passes through the central opening 24 and is thus properly held in the path of movement of a stem cutter 25 which is mounted on one of the leaf plates, and preferably leaf plate 17. Specifically, plate 17 carrying the cutter 25 is provided on its end opposite its hinged end with a central recess that captures stem 23 as the leaf plates move from their open to their closed position, thus properly locating the stem relative to the path of movement of the stem cutter. Optionally, plate 19 opposite plate 17 may be provided with a central recess 26 that assists in the capture of stem 23. On the other hand, recess 26 may be absent and the centering of the stem 23 will be achieved by the simultaneous and coordinated movement of the free ends of the leaf-plates as they move to their closed position.

After the fruit 22 is located within frame 12 and the stem 23 is captured in the central opening 24 of the cover, the stem cutter operator 15 can be actuated as shown in FIG. 3 for the purpose of causing the cutter head of the stem cutter 25 to move across the stem 23 thus severing the fruit as shown in FIG. 3. The severed fruit will fall vertically and may be caught by the person operating the apparatus. Alternatively, a tubular chute 26 may be attached to the bottom open end of frame 12 for the purpose of collecting the picked fruit, or guiding the fruit to a suitable container and at the same time slowing the fall of the fruit and thus preventing bruising.

Where the chute acts as a collector, the weight of the apparatus adjacent the frame on the end of the rod will increase as fruit is picked thus tending to make the apparatus unwieldy and difficult to handle. In such case, it may be desirable to rest the rod on a tripod placed on the ground. This arrangement will provide a sturdy support for the apparatus and will make handling thereof considerably easier. Additionally, all of the parts of the apparatus may be made of a perforated sheet to lighten it.

The chute may also be designed (see FIG. 7) to act as a brake for slowing the picked fruit on its way to a container. In such case, the inner walls of the chute may be provided with a plurality of axially spaced annular rings of foam rubber which reduce the cross-section of the chute and serve to engage the fruit during its descent, slowing the fall without bruising the fruit. In addition, a series of flaps of polyurethane or the like can be attached to various rings or to the wall of the chute along one side, which flaps project more than half way across the chute and form a buffer between individual pieces of fruit to prevent bruising. In order to prevent clogging of the chute, a flexible connection such as a cable can be attached to the free ends of the flaps for selectively moving them in the chute and thus releasing fruit collected inside the chute. With this arrangement, actuation of the cutter operator can be coupled to the flexible connection thus ensuring that upon each actuation of the cutter, the projections will be moved periodically, clearing the chute.

An actuatable flap may be provided at the bottom of the chute to control the exit of fruit. Actuation of the flap may be associated with the actuation of the cutter operator, and in such case a flexible cable may be connected between the cutter operator and the flap. Alternatively, the bottom of the chute may be provided with a padded elbow that breaks the fall of the fruit in the chute and permits the fruit to exit one-at-time from the chute.

While manual actuation of the leaf plate operator and the cutter operator has been referred to above, the present invention contemplates the use of power actuation as with electrical or pneumatic means. To provide further flexibility in gathering fruit at different levels, the rod may be in the form of telescoping tubes that may be spring loaded to provide vertical play in the rod that will assist in capturing fruit. On the other hand the rods may be extendible by the operator in accordance with the level of the fruit to be picked. Alternatively, or in addition, the frame may be removably mounted on the rod so as to be interchangeable to permit a frame of optimum size to be used for a given type and size of fruit. Instead of changing the frame, the leaf plates themselves could be made adjustable to accommodate fruit of different sizes.

In order to ensure the closing of the leaf plates prior to the actuation of the cutter, regardless of the size of fruit involved, magnets may be provided on the leaf plates where they overlap. When the leaf plates are almost closed, the magnets will become effective to urge the leaf plates to their fully closed position.

To accommodate or to compensate for stems of different thickness, it is possible to mount the cutter apparatus on a leaf-plate such that the cutter is radially movable on the leaf-plate for the purpose of changing the position of the cutters relative to the hinge of the leaf-plate. When this is done, it is preferred to provide for the cutter apparatus to be spring loaded away from the hinge connection so that larger than usual stems can be accommodated by the cutter mechanism. Alternatively, it is also possible to provide for the hinge connection of the leaf-plate carrying the cutter apparatus to be adjustable on the frame.

When harvesting fruit such as pears, which have an elongated, narrow portion adjacent the stem, it may be helpful under some circumstances to provide an auxiliary leaf plate associated with the leaf plate having the cutter apparatus. In such case, the cutter apparatus itself would be sandwiched between the normal leaf-plate and the auxiliary plate. The free end of the auxiliary plate would then serve to cause the stem of the pear to stand-off from the cutter blades so that, upon actuation of the cutter operator, the stem of the pear will be severed and not the fleshy part of the pear. This arrangement will insure a substantial length of stem to remain attached to the body of the fruit, a situation that is permissible with many fruits although not desirable for avocados.

In a further alternative arrangement, the frame 12 may be formed large enough to accommodate several pieces of fruit simultaneously and in such case a plurality of covers could be connected to the top of the enlarged frame. In such case, a number of separate pieces of fruit could be simultaneously severed from a tree thus further facilitating the harvesting of a crop. When this approach is taken, the leaf plates of each of the covers must open to a full 90° position such that no gap exists between the open leaf plates of adjacent covers. This arrangement will prevent individual pieces of fruit in a cluster from being caught in the gap instead of being caught within one of the open covers.

In order to ensure that the stems of the fruit will be cut as close as possible to the body of a piece of fruit, the embodiment shown in FIG. 4 may be utilized. Head 50 shown in FIG. 4 comprises a frame 51, a plurality of hinged leaf-plates like those shown in FIGS. 1–3, defining a cover 52 (only one leaf plate being shown), and an adjustable support 53 for centering and properly holding the fruit prior to the closing of the cover 52. Head 50 is designed for attachment to a rod; and cover 52 is provided with cutter apparatus mounted on one of the leaf-plates. The leaf-plates and the cutter apparatus are actuatable by a leaf-plate operator and a stem cutter operator on the rod as previously described, and hence these components are not shown in FIG. 4.

Preferably, although it is not essential, both frame 51 and adjustable support 53 are cylindrical in cross-section with support 53 being telescopically receivable and slidably within the frame 51. Axial movement of support 53 within the frame is limited by headed pins 54 attached to support 53 and passing through suitable slots 55 in frame 51. A plurality of torsion springs 56 mounted on frame 51 below the support 53 resiliently urge the support upwardly towards the cover 52.

Pivotally mounted within support 53 are a pair of flaps 57, the pivotal connection between flaps 57 and support 53 being accomplished by hinge connection 58. Each of flaps 57 comprises a central triangular region 59 on each side of which is an upturned triangular portion 60. Each of flaps 57 is urged upwardly by a suitable torsion spring 61 cooperating with hinge connection 58. With this arrangement, the pair of flaps 57 form a generally conically shaped depression that serves to center a piece of fruit 62 within the frame 51 when head 50 is brought into engagement with the fruit.

The resilient connection between support 53 and frame 51 compensates for operator error in raising the frame too high with respect to the fruit being picked. Normally, in the embodiment shown in FIG. 1, for example, raising the frame higher than is proper for the height of the fruit on the tree would cause the stem to be cut at a point remote from the connection of the stem to the fruit. In many cases this is not desirable, and support 53 will ensure that the stem will be cut adjacent to its connection to the body of the fruit. This is achieved because once fruit 62 engages the flaps 57, the cover operator may be actuated closing the cover and capturing the fruit between the cover and the flaps with the cutter mechanism adjacent the connection of the stem to the body of the fruit. When the stem cutter operator is actuated, the initial movement may close the cutter severing the stem while either the final movement of the operator or its release, can be coupled by means of flexible cables 64 to the free ends of flaps 57 such as to pivot the flaps downwardly, releasing the fruit 62 and permitting it to fall through the lower open end of frame 51.

Figure 6:
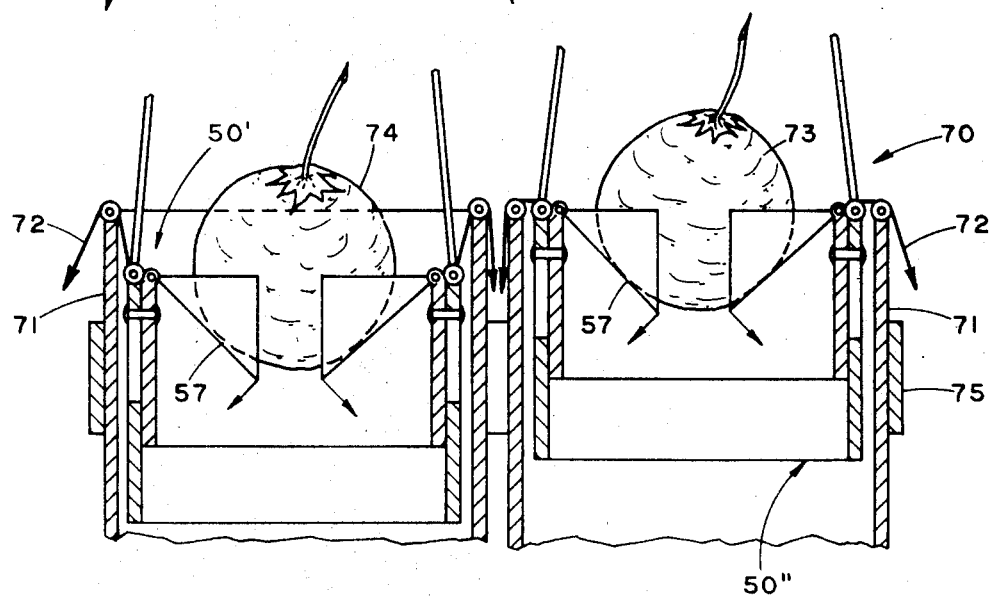
FIG. 6 is a sectional view of a third embodiment of the invention.

Head 50 is particularly well suited for combining into a multiple head device such as shown in FIG. 6 to permit a plurality of pieces of fruit located at different elevations to be severed in one operation simultaneously. Accordingly, apparatus 70 shown in FIG. 6 comprises a plurality of heads 50' and 50'' individually mounted in sleeves 71 held together by strap 75. A plurality of flexible cables 72 are connected to each head and resiliently urge it upwardly. When the apparatus 70 is raised into a tree bearing fruit 73 and 74, which are at different elevations, the lower hanging fruit 74 will overcome the spring bias on flexible cable 72 pushing head 50' downwardly until an equilibrium position is reached. At equilibrium, fruit 73 and fruit 74 will have moved heads 50' and 50'' to a relative position within the cages 71 at which each piece of fruit will be engaged with flaps 57 of the heads. Actuation of the leaf-plate operator will close each cover capturing the stems of each piece of fruit and permitting the stem cutters to sever the stems of each piece of fruit adjacent the connection of the stem to the body of the fruit. This occurs regardless of the difference in height of the pieces of fruit. As a result, apparatus 70 will facilitate picking of fruit because many pieces of fruit can be severed at the same time. While two heads are shown in apparatus 70, it is obvious that more heads than two can be combined in a single device.

As a further modification of the single head device shown in FIGS. 1–5, it is possible for the axis of the rods supporting the head to be inclined relative to the axis of the frames 12 or 51. This arrangement will permit a person picking fruit to stand to the side of the particular piece being picked rather than directly beneath it. To further improve this type of operation, the head may be mounted in a universal joint for free movement in all directions, but spring loaded to a normal position from which it can resiliently be moved if necessary when engaged by a piece of fruit high in a tree as the user attempts to properly position the head from his location on the ground. Alternatively, the spring loaded head may be tiltable in a remote manner by means of flexible cables connected to the head and operated by the user on the ground. This arrangement will permit the user to properly orient the head with respect to a piece of fruit to be picked so as to capture the stem of the fruit properly.

With regard to the previously described chute-brake for temporarily storing the picked fruit or slowing its descent from the head into a container, fruit of different sizes, such as lemons on the one hand, and grapefruit on the other, can be accommodated by providing chute-brakes of different sizes. The availability of chute-brakes of different sizes permits selection of a chute to collect fragile objects other than fruit, as for example, eggs. In such case, an inclined trough next to the roost of a hen-house could direct eggs to a central collection depot at which the chute previously described can be installed. The angular rings of foam rubber 90 attached to the fabric or plastic sleeve 91 shown in FIG. 7 and the foamed flaps 92 attached to the rings would cushion the fall of a succession of eggs permitting the chute 93 to be used as a collector in a hen-house, and afterwards as a container for transporting the eggs from the producer to a user. Movement of flexible cables 94 would impart movement to the flaps 92 to facilitate dispensing of the eggs much the same as such movement prevents clogging of the chute when used to collect fruit.

When the chute acts only as a brake for the fruit picked from the trees, clogging can be precluded if the free ends of the flaps are coupled to the leaf-plate operator in addition to, or in place of, being coupled to the cutter operator. Coupling of the flaps to both operators will enable a sequential and differential movement to be imparted to the flaps in order to enhance movement of the fruit through the chute.

Referring again to the head 51 shown in FIGS. 4–6, the cushioning effect exerted on the fruit by support 53 can be enhanced by making the support in several segments, rather than unitary as shown in the drawing, and spring mounting these segments. The several segments of support 53 could be free to move radially to expand or contract as required by the size of the fruit being picked. In such case, it is desirable to spring load the several segments to control their movement.

The flexible links 64 used to operate flaps 57 can be attached to the flaps at a point close to the hinge connection 58 in order to reduce the displacement of the links necessary to pivot the flaps and drop the fruit through the frame. Instead of coupling these links 64 to the cutter operator, they may be coupled to the leaf-plate operator instead. Thus, opening of the leaf-plates in preparation for the picking of the next piece of fruit could be utilized to pivot the flap permitting the fruit previously picked to be dropped through the frame.

Instead of providing annular rings of foam rubber and flaps that act as cushions, it is possible to construct the chute as follows. The sleeve 91 is fashioned from a flat sheet of fabric or plastic material provided with many rows of holes punched through the material, the spacing between the rows ultimately defining the spacing between the cushions to be used inside the chute upon assembly. Four holes are provided in each row so that when the longitudinal edges of the sheet are overlapped to define a tube, the four holes of a given row define the edges of a square circumscribed within the tube. Through opposite pairs of these holes is passed a flexible resilient member, such as a rubber strip or a garter spring, to establish a pair of supports for a cushion. The spacing between the supports which depends upon the spacing between the four holes in a row, is selected so as to exceed the largest dimension of the items to be transported by the completed chute.

Each cushion is in the form of a rectangular sheet of soft, resilient material such as foam rubber or foamed polyurethane, the width of the sheet being greater than the spacing between the supports and the length being just greater than about half the diameter of the completed tube. Clips on the cushion permit it to be secured to the tops of the supports. If desired, the sheet forming the cushion may be provided with a tongue of reduced width located on a transverse edge so as to increase the cushioning effect.

To assemble the above described chute, the sleeve is constructed by rolling the perforated sheet of material into a tube and securing the overlapped edges by rivets, welding, etc. At the necessary intervals, resilient members are strung between the holes of a row. Finally, the cushions are attached to the resilient member. In use, the cushions act as a break on falling objects while, at the same time, maintaining a resilient separation between successive objects as they are stacked within the chute.

Figure 8:
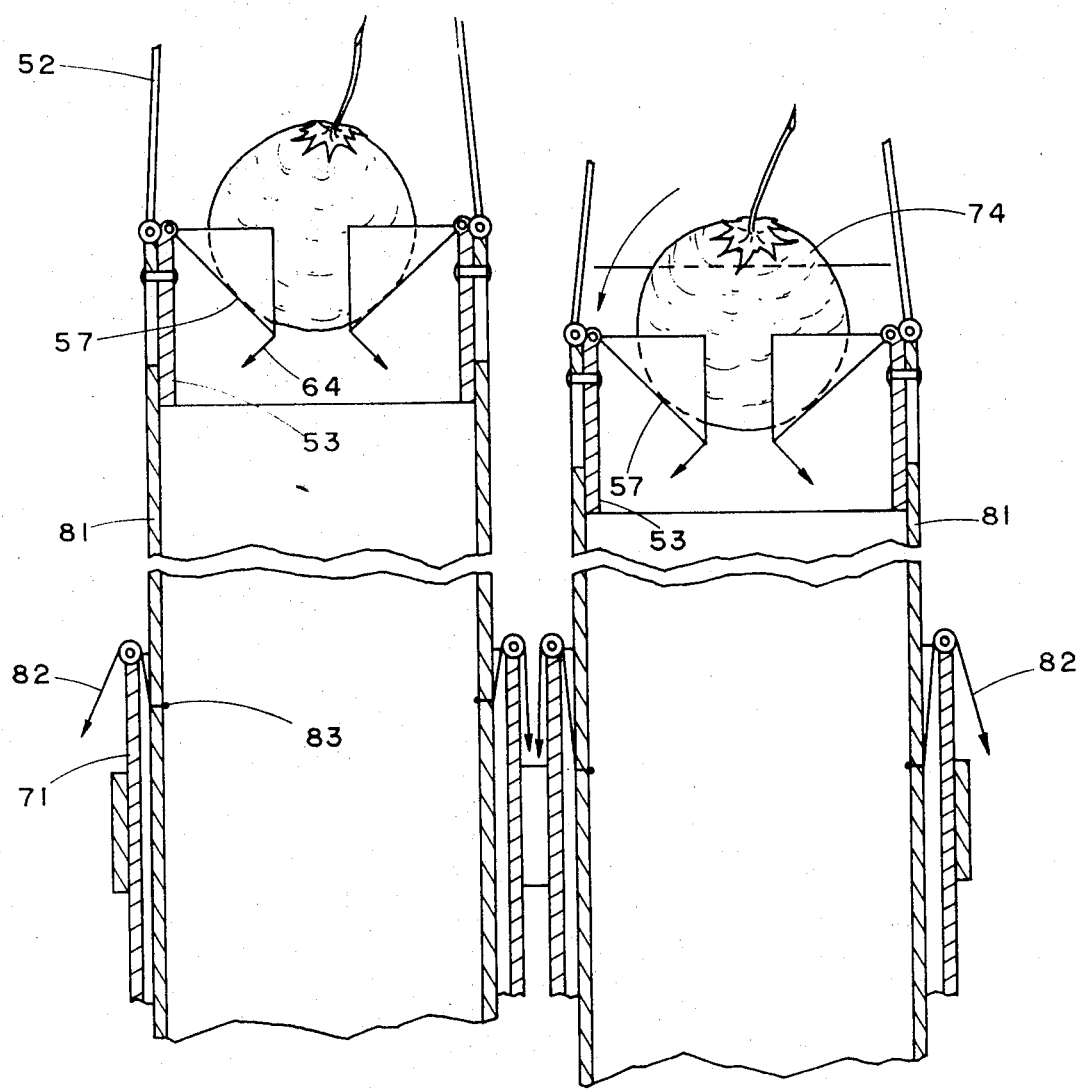
FIG. 8 is a sectional view of a fourth embodiment of the invention.
Figure 7:
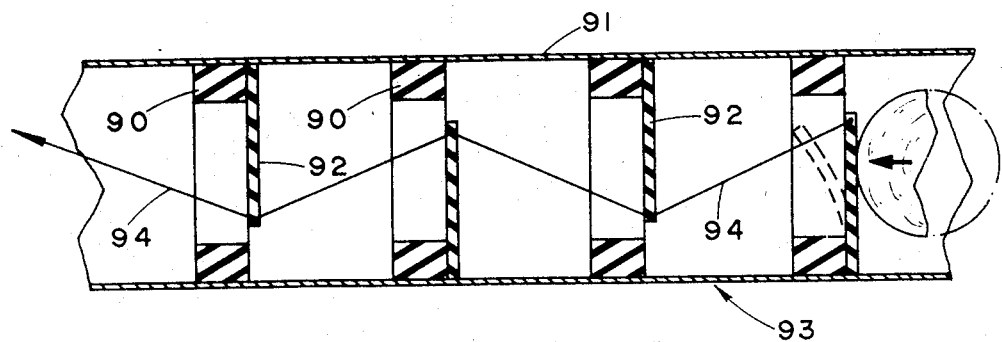
FIG. 7 is a longitudinal sectional view of a chute-brake for cushioning fruit or other objects.

A modification of the apparatus of FIG. 6 is shown in FIG. 8 wherein a plurality of heads similar to heads 50 of FIG. 4 are utilized in a sleeve arrangement similar to sleeves 71. In this modification, the frame of each head is provided with an elongated tubular frame 81 that is mounted in the sleeve 71 such that flexible links 82 are connected to the frames at a point 83 remote from the free ends thereof. By this arrangement, the frames 81 will project above the free top edge of the sleeve 71. In FIG. 7, the heads include flaps 57, leaf-plates forming a cover 52, and a cutter mechanism (not shown). Instead of being spring or weight loaded, links 82 may be connected to a pneumatically or electrically operated device by which the frames 81 can be moved upwardly or downwardly within sleeve 71 by an operator to accommodate fruit at various levels on the tree. In the preferred arrangement, the frames 81 are about one metre or more in length; and in such case, the tubular support 53 of the heads are mounted for limited sliding movement in frames 81 near the top thereof to permit automatic compensation for operator error in positioning the apparatus relative to the fruit to be picked. As in the previous case, flexible links 64, by which the flaps 57 may be selectively pivoted to permit the fruit 74 to drop after being severed from the tree, may be connected to either the leaf-plate operator or the cutter mechanism operator. In the event that the link 64 is connected to the leaf-plate operator, the opening of the leaf-plates of the cover would actuate the flaps 57; while on the other hand, when links 64 are connected to the cutter mechanism operator, release of the operator for the purpose of moving the cutter apparatus back to its initial position will be utilized for the purpose of pivoting flaps 57.

In utilizing the apparatus shown in FIG. 8 for the purpose of simultaneously picking a plurality of pieces of fruit from a tree, it is necessary to prevent successive pieces growing on a single branch from following the lowermost piece into one of the frames 81. To this end, the frames may be provided with extendible side flaps shown schematically on the left-hand frame shown in FIG. 8. The flap may comprise three articulated members, one of which is hingedly attached to the top edge of a frame, and one of which is hingedly attached between the free end of the first mentioned member and the free end of a third member which is pivotally attached to the frame remotely from the first member. A spring interposed between the frame and the third member resiliently urges the flap into an open position. As a consequence, the downward movement of an adjacent frame will cause the automatic extension of the three members thus forming a cover over the frame containing the lowermost piece of fruit. Successive pieces are thus deflected away from the lowermost frame after it has captured a piece of fruit.

In a further modification, the apparatus may be provided with a single head arranged so that the frame projects above the sleeve which may be mounted on a suitable rod. In this arrangement also, the frame may be extendible or retracted pneumatically or electrically. This arrangement will permit an operator to exert close control over the extension and will thus materially expedite the picking of the fruit.

I claim:

1. A cutterhead for picking fruit growing on a tree comprising an open frame to which an elongated rod is attachable and on which a plurality of leaf-plates are pivotally mounted for movement from an open position, uncovering the frame and effecting entry thereinto of a piece of fruit attached by a stem to the tree, to a closed position covering the frame; a spring urging the leaf-plates from closed to open position; a selectively actuatable leaf-plate operator for pivoting the leaf-plates against the action of the spring; the leaf-plates being shaped so that, in their closed position, a central opening is defined for holding a stem in a fixed position relative to the leaf-plates; a stem cutter mounted on one of the leaf-plates and having a movable cutter bar whose path of movement crosses the central opening for severing a stem held therein; and a selectively actuatable stem cutter operator for moving the cutter bar.

2. A cutterhead according to claim 1 wherein four quadrantly located leaf-plates are interleaved so that the opening of one plate imparts opening movement to the other three plates.

3. A cutter head according to claim 1, wherein the pair of plates located at 90° to the one plate overlie the latter and have free ends opposite their hinged ends that are spaced from their other when the leaf-plates are in closed position.

4. A cutterhead according to claim 3 wherein the one plate carries the cutter and the plate opposite the one plate is provided on its end opposite its hinged end with a central recess for capturing the stem of a piece of fruit when the cover is closed.

5. A cutterhead according to claim 2 wherein the spring acts on the one plate.

6. Apparatus using a plurality of cutterheads in accordance with claim 1 for simultaneously picking a plurality of pieces of fruit comprising means connecting all of the stem cutter operators together for simultaneously severing a plurality of pieces of fruit captured by the leaf-plates of the respective cutterheads.

7. Apparatus according to claim 1 wherein the frame is slidably mounted in a sleeve attachable to the rod.

8. Apparatus according to claim 7 wherein a tubular support is movably mounted in the frame and is provided with means responsive to engagement with a piece of fruit to move the support relative to the frame for compensating for operator error in the vertical positioning of the apparatus relative to the piece of fruit.

9. Apparatus according to claim 8, wherein the frame is selectively extendable from or withdrawable into the sleeve.

10. Apparatus according to claim 1 including a chute for cushioning the fall of or transporting fruit picked from a tree, the chute being attached to the frame and including means for slowing the descent of fruit through the chute.

11. Apparatus for picking fruit utilizing a cutterhead in accordance with claim 1 in combination with a chute attached to the frame for cushioning the fall of or transporting the fruit severed by the stem cutter wherein the chute comprises a flexible tubular sleeve, a plurality of spaced annular rings of resilient material fixed to the inside of the sleeve for locally reducing its cross-sectional area, and resilient flaps on some or all of the rings extending across the opening therethrough.

12. Apparatus according to claim 11 wherein a flexible link is connected to a plurality of the flaps and to the stem cutter operator for the purpose of effecting simultaneous movement of the connected flaps relative to the rings upon actuation of the stem cutter operator thereby facilitating the movement of objects through the rings.

13. Apparatus for picking and collecting fruit growing on a tree comprising: a cutterhead; a stem cutter mounted on the head and having a movable cutter bar; means for positioning the stem of a piece of fruit within the path of movement of the cutter bar; a stem cutter operator for selectively moving the cutter bar; and a chute for cushioning the fall of or transporting a piece of fruit whose stem has been severed by the cutter bar, the chute comprising a flexible tubular sleeve, a plurality of spaced annular rings of resilient material fixed to the inside of the sleeve for reducing its cross-sectional area, resilient flaps on some or all of the rings extending across the opening therethrough, and a flexible link connected to some or all of the flaps and to the stem cutter operator for the purpose of effecting simultaneous movement of the flaps relative to the rings in response to operation of the stem cutter for the purpose of facilitating the movement of pieces of fruit through the rings.

* * * * *